United States Patent [19]

Glachet

[11] Patent Number: 5,421,626
[45] Date of Patent: Jun. 6, 1995

[54] CENTRALIZED CONTROL MECHANISM WITH INCORPORATED SAFETY MEANS FOR A DEVICE FOR A TIGHT TRANSFER BETWEEN TWO CLOSED VOLUMES

[76] Inventor: Charles Glachet, 42, rue du Maréchal de Rochambeau, 41100 Vendome, France

[21] Appl. No.: 115,877

[22] Filed: Sep. 1, 1993

[30] Foreign Application Priority Data

Sep. 4, 1992 [FR] France ............................. 92 10575

[51] Int. Cl.⁶ .............................................. E05C 7/06
[52] U.S. Cl. ................................. 292/256.5; 292/241; 220/318
[58] Field of Search ...................... 292/256.5, 208, 241; 141/383, 384, 386

[56] References Cited

U.S. PATENT DOCUMENTS

| | | | |
|---|---|---|---|
| 3,055,405 | 9/1962 | Pase ..................................... | 141/384 |
| 3,086,565 | 4/1963 | Mosher ................................ | 141/384 |
| 3,164,403 | 1/1965 | Jerome et al. ..................... | 292/256.5 |
| 3,270,801 | 9/1966 | Richter et al. ..................... | 292/256.5 |
| 3,682,208 | 8/1972 | Fedi et al. | |
| 4,274,454 | 6/1981 | Cook .................................. | 141/383 |
| 4,494,586 | 1/1985 | Picard . | |
| 4,570,816 | 2/1986 | Ferris et al. ......................... | 220/314 |
| 4,928,615 | 5/1990 | Williams ............................. | 114/203 |
| 4,941,695 | 7/1990 | Miller ................................. | 292/256.5 |

FOREIGN PATENT DOCUMENTS

2441243  6/1980  France .
2038920  7/1980  United Kingdom .
2102719  2/1983  United Kingdom .
2218663  11/1989 United Kingdom .

*Primary Examiner*—Peter M. Cuomo
*Assistant Examiner*—Monica E. Millner

[57] ABSTRACT

In a double door device for the tight transfer between two closed volumes a centralized control mechanism (28) having incorporated safety means is proposed. This mechanism (28) comprises a mobile control member (36), placed opposite to a hinge of one (22) of the doors and facing a part (42) connected to said door (22). The mechanism integrates four mechanical bolts (48,62,78,92). Two of them (48,62) prevent any opening manipulation when a second door is not present and when a second flange is not entirely connected to the flange carrying the control member (36). A third bolt (78) prevents any disconnection between the two flanges after the control member (36) has cleared an intermediate locking position. Finally, a fourth bolt (92) prevents the return of the control member (36) to its initial position when the doors are open. In a certain number of industrial fields, e.g. the nuclear, medical, pharmaceutical and electronic fields, it is necessary or desirable to carry out certain tasks in a confined atmosphere, either to protect personnel against certain dangers (radioactivity, toxicity, etc.) resulting from the product used during the performance of these tasks, or conversely in order to protect said tasks in a dust-free or aseptic atmosphere.

10 Claims, 5 Drawing Sheets

CENTRALIZED CONTROL MECHANISM WITH INCORPORATED SAFETY MEANS FOR A DEVICE FOR A TIGHT TRANSFER BETWEEN TWO CLOSED VOLUMES

DESCRIPTION

The invention relates to a centralized control mechanism having incorporated safety means designed for use in a double door device, making it possible to ensure a tight transfer between two closed volumes, following the engagement of said two volumes and the opening of the double door.

In a certain number of industrial fields, e.g. the nuclear, medical, pharmaceutical and electronic fields, it is necessary or desirable to carry out certain tasks in a confined atmosphere, either to protect personnel against certain dangers (radioactivity, toxicity, etc.) resulting from the product used during the performance of these tasks, or conversely in order to protect said tasks in a dust-free or aseptic atmosphere.

In these different industrial fields, the transfer of equipment or products from one closed volume to another, without at any moment breaking the seal of each of the said volumes with respect to the exterior, gives rise to a problem which is difficult to solve. This problem is generally solved by means of tight, double door transfer devices, whose different components are equipped with joint systems maintaining the seal at all stages of the operations of connecting and separating the closed volumes.

These tight transfer devices generally comprise two flanges defining in the walls of two volumes to be connected circular openings which are normally closed by the doors. When a communication must be made between the two volumes, the two flanges are engaged with one another and interlocked under the effect of a relative rotary movement by a bayonet joint. This rotary movement also has the effect of interlocking the two doors by means of another bayonet joint.

The tight, double door transfer devices also incorporate control members, which can be manipulated from the inside of one of the two volumes, with the aid of remote control means such as telemanipulators or gloves, in order to open the double door for linking the two volumes. In addition, a certain number of safety devices are provided to prevent inappropriate manipulations leading at any time to any risk of the seal of the closed volumes being broken.

As is more particularly illustrated by FR-A-2 496 325, the mechanisms making it possible to control the opening and closing of the double door and the safety devices are normally separate from one another and positioned at different locations over the entire periphery of the flanges. This consequently leads to an increase in the complexity of these tight, double door transfer devices and consequently reduces reliability whilst at the same time increasing cost.

The invention relates to a centralized control mechanism having incorporated safety means for installation on a tight, double door transfer device, so as to obtain a particularly simple, inexpensive and reliable device.

SUMMARY OF THE INVENTION

According to the invention, this result is achieved by means of a centralized control mechanism having incorporated safety means, for a device for the tight transfer between two closed volumes, said device incorporating a first and a second flange which can be interlocked with one another by a first bayonet joint, and a first and second door normally closing the openings defined respectively by the first and second flanges and which can be locked with one another by a second bayonet joint, said control mechanism comprising:

a mobile control member mounted on the first flange so as to be displaceable between a closed position and an open position, whilst passing through an intermediate locking position, a system of ramps interposed between the control member and the first door, so as to separate the latter from the first flange during a displacement of the control member from its locking position to its open position, a first bolt normally locking the control member in its closed position and automatically unlocked by the presence of the second door against the first door, a second bolt normally locking the control member in its closed position and automatically unlocked by the interlocking of the second flange on the first flange by the first bayonet joint, a third bolt normally unlocked when the control member is in its closed position and automatically locking the first bayonet joint in a state of interlocking the first and second flanges when the control member is located between its locking and open positions or in one of these positions and a fourth bolt, which is normally unlocked when the control member is in its closed position and automatically opposing the return of said member to its closed position following a separation of the first door controlled by the system of ramps, when the control member is located between its locking and open positions or is in one of these positions.

According to a first embodiment of the invention, the first bolt comprises a first mobile locking member supported by the first door on the side opposite to the second door, said locking member having a first control rod which traverses the first door and a locking part able to cooperate with a complementary part of the control member, when said member occupies its closed position and when the second door does not force back the control rod in order to ensure the locking of the control member.

Moreover, advantageously the second bolt comprises a first locking rod slidingly mounted in a bore of the control member, a first elastic means tending to displace said locking rod towards the first flange, so as to partly introduce it into a through bore formed in said flange, when the control member occupies its closed position and a second control rod slidingly mounted in said through bore, so as to project on one face from the first flange turned towards the second flange, at a location such that said control rod is only forced back, to allow a rotation of the control member, when the first bayonet joint is locked.

In the preferred embodiment of the invention, the third bolt comprises a second locking rod slidingly mounted in a second bore of the first flange, second elastic means applying one end of said locking rod against a cam surface formed on the control member, in such a way that the opposite end of the second locking rod is retracted into the second bore when the control member is in the closed position, and projects on one face of the first flange turned towards the second flange, at a location such that it locks the first bayonet joint in a locked position, when the control member is between the locking and open positions or is in one of these position.

Moreover, advantageously, the fourth bolt comprises a locking finger slidingly mounted in a third bore of the first flange, third elastic means tending to apply the locking finger to a facing face of the control member, a trapping slot formed in said facing face, so as to face the locking finger when the control member is between the locking and open positions or is in one of these positions, and a bearing surface linked with the first door, maintaining the locking finger entirely in the third bore when the first door is not separated from the first flange.

Preferably, the system of ramps comprises two parallel, facing ramps, linked with the first door, and a roller carried by the control member and simultaneously co-operating with said two parallel ramps.

The bearing surface of the fourth bolt and the parallel ramps of the system of ramps are advantageously formed on a part which can be fixed to one face of the first door opposite to the second door, said part also supporting the first bolt.

In the preferred embodiment of the invention, the control member is a pivoting member mounted on one face of the first flange opposite to the second flange by means of a pivoting shaft. However, it should be noted that the control member could also be constituted by a member mobile in translation.

Moreover, although a motorized control of the control member can be used, the latter is advantageously provided with a manual control lever.

BRIEF DESCRIPTION OF THE DRAWINGS

The invention is described in greater detail hereinafter relative to a non-limitative embodiment and the attached drawings, wherein show.

DETAILED DESCRIPTION OF THE PREFERRED EMBODIMENTS

In the preferred embodiment of the invention illustrated in the drawings, the two closed volumes which it is wished to connect with the aid of a tight, double door transfer device equipped with a centralized control mechanism with incorporated safety means according to the invention respectively correspond to a confinement cell 10 and a transportation container 12. However, it will be clear that the invention is also applicable in cases where the closed volumes have different shapes or forms.

Figure 1:
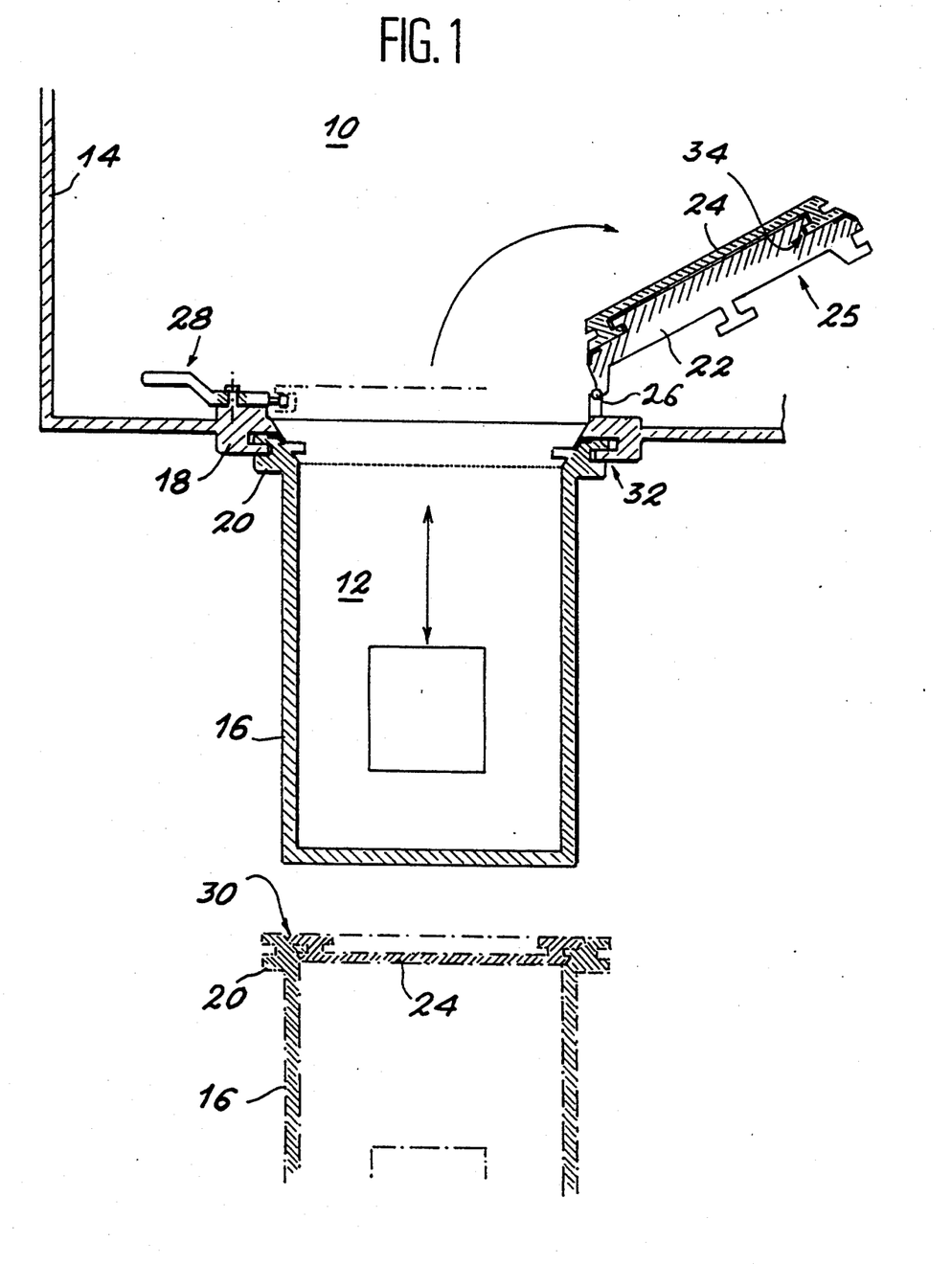
FIG. 1 A cross-sectional view diagrammatically illustrating the connection of a container to a cell by means of a tight, double door transfer device equipped with a centralized control mechanism according to the invention.

The cell 10 is defined by a wall 14, whereof only part is visible in the drawings. In conventional manner, it is equipped with remote manipulation means such as telemanipulators and/or gloves (not shown) integral with the wall 14 and by means of which the centralized control mechanism according to the invention can be manipulated from the interior of the cell 10. The container 12 is also defined by a wall 18, as illustrated in FIG. 1.

The tight, double door transfer device in which is used the centralized control mechanism according to the invention essentially comprises a cell flange 18, a container flange 20, a cell door 22 normally closing a circular opening defined by the cell flange 18 and a container door 24 normally closing an opening defined by the container flange 20. The cell flange 18 and the container flange 20 are respectively fixed to the wall 14 of the cell 10 and to the wall 18 of the container 12.

The cell door 22 is articulated to the cell flange 18 by a hinge 26. At a diametrically opposite location with respect to said hinge 26, a centralized control mechanism 28 makes it possible, according to the invention, to control the opening and closing of the doors 22 and 24, as well as the safety means incorporated into said mechanism 28, when the container 12 has been mounted on the cell 10. The container door 24 is fixed to the container flange 20 in conventional manner by a bayonet joint 30.

In order to permit the interlocking of the container flange 20 and the cell flange 18 and the interlocking of the container door 24 and the cell door 22, the tight, double door transfer device also comprises in known manner two other bayonet joints respectively designated 32 and 34.

In a conventional manner, the three bayonet joints 30, 32 and 34 are arranged in such a way that following the engagement of the container flange 20 on the cell flange 18, a rotation of the container 12 about its axis or shaft in the clockwise direction has the effect of interlocking the container flange 20 and the cell flange 18, interlocking the container door 24 and the cell door 22 and unlocking the container door 24 from the container flange 20. The two latter operations take place consecutively, so that the opening of the container only takes place when the container door 24 has been interlocked with the cell door 22 in order to form a double door 25.

The centralized control mechanism 28 having integrated safety means will now be described in greater detail with reference to FIGS. 2 to 11. The control mechanism 28 firstly comprises a mobile control member 36, articulated to the cell flange 18 by a shaft 38 in the represented embodiment. More specifically, the shaft or pin 38 is oriented parallel to the axis of the circular opening defined by the flange 18 and the mobile control member 36 is in contact with the face of said flange 18 turned towards the interior of the cell 10. The mobile control member 36 is equipped with a lever or handle 40 permitting the manual control of its rotation.

In a not shown constructional variant, the control member 38 is rotated in automated manner by a motorization means placed within the cell 10. In this case, the control of the motorization means can be directly accessible from the exterior of the cell without having to use remote manipulating means.

The centralized control mechanism also comprises, in front of the control member 36, a part 42 which is fixed to the face of the cell door 22 turned towards the interior of the cell 10. As can be more specifically gathered from FIGS. 7 and 8, said part 42 has on its outer edge turned towards the control member 36 a slot, whose opposite edges form two facing, parallel ramps 44. These two ramps 44 guide a rotary roller 46, whose spindle is fixed to the edge of the control member 36 turned towards the part 42 and oriented radially with respect to the rotation shaft 38 of said member 36.

Figures 2, 5:
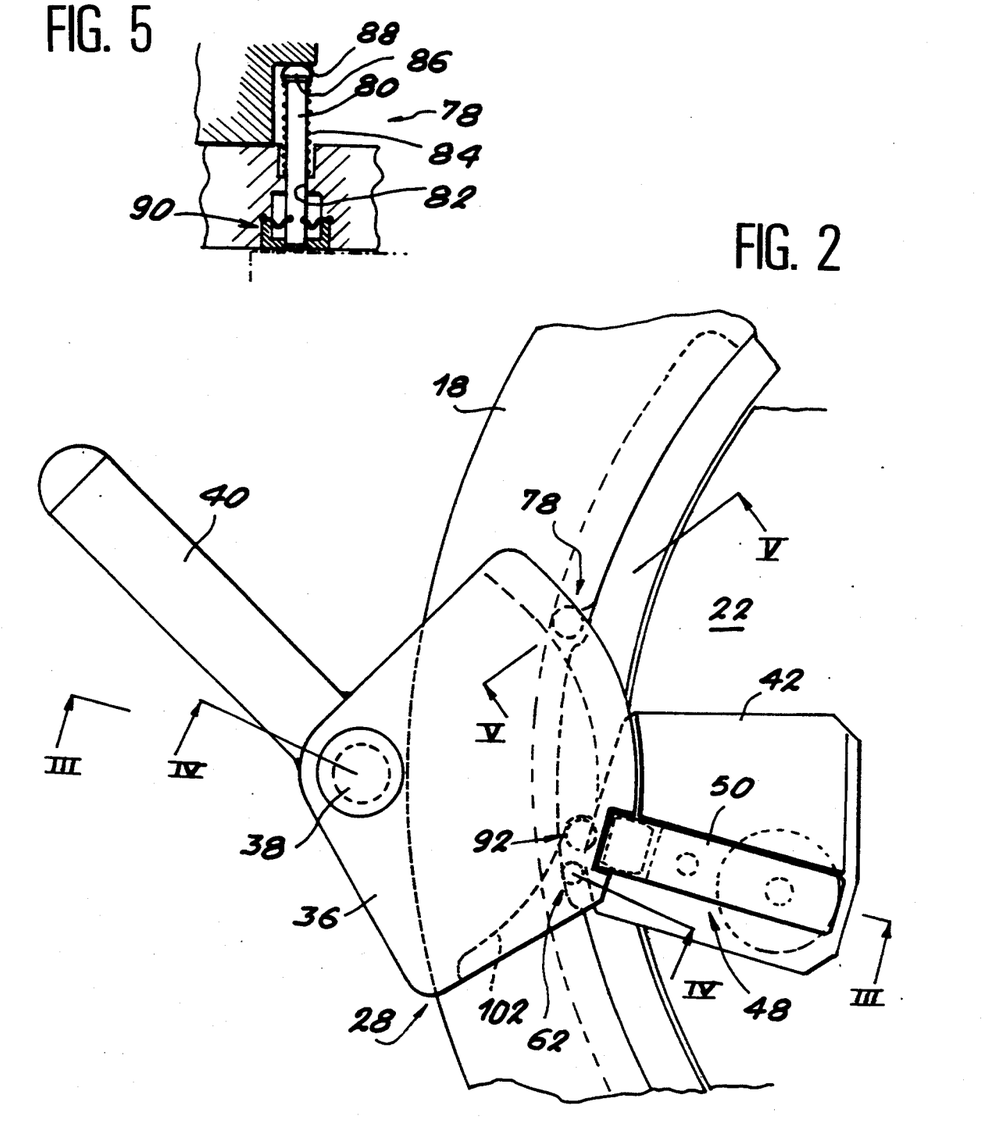
FIG. 2 A front view from the interior of the cell of the centralized control mechanism shown in its closed position.
FIG. 5 A sectional view along line V—V of FIG. 2.
Figure 6:
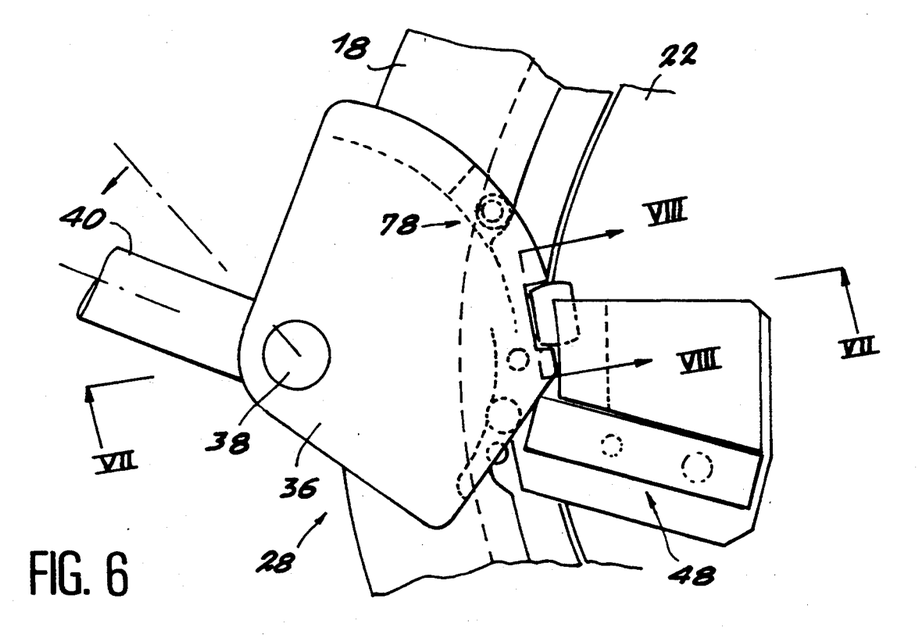
FIG. 6 A front view, comparable to FIG. 2, of the centralized control mechanism shown in its intermediate locking position.
Figures 7, 8:
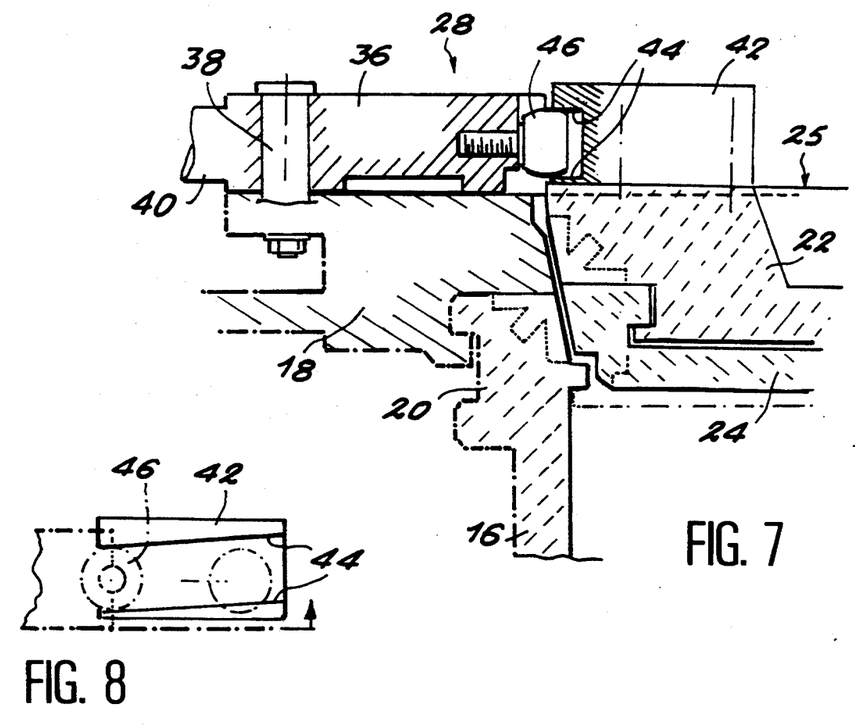
FIG. 7 A sectional view along line VII—VII of FIG. 6.
FIG. 8 A sectional view along line VIII—VIII of FIG. 6.

The arrangement described hereinbefore makes it possible to control the separation or pulling away of the double door 25 by a rotation of the control member 36 in the counterclockwise direction with respect to FIGS. 2 and 6, and the closing of the double door by an opposite rotation of the control member 36.

The centralized control mechanism according to the invention also comprises a certain number of incorporated safety means in the form of bolts which will now be described.

A first bolt 48 (FIGS. 2, 3 and 11) have the function of locking the control member 36 in an extreme closing position, in which the cell door 22 tightly closes the cell flange 18. This first bolt 48 comprises a mobile locking member 50 mounted on the part 42 in such a way as to move parallel to the axis of the cell door 22 supporting said part 42, between a normal locking position of the control member 36 and an unlocking position for said member. This guidance is ensured by a rod 52 fixed in the cell door 22 and in the part 42 parallel to the axis of the cell door and by a control rod 54 integral with the mobile locking member 50 and which traverses the part 42, as well as the cell door 22 parallel to the axis of the latter.

Figure 3:
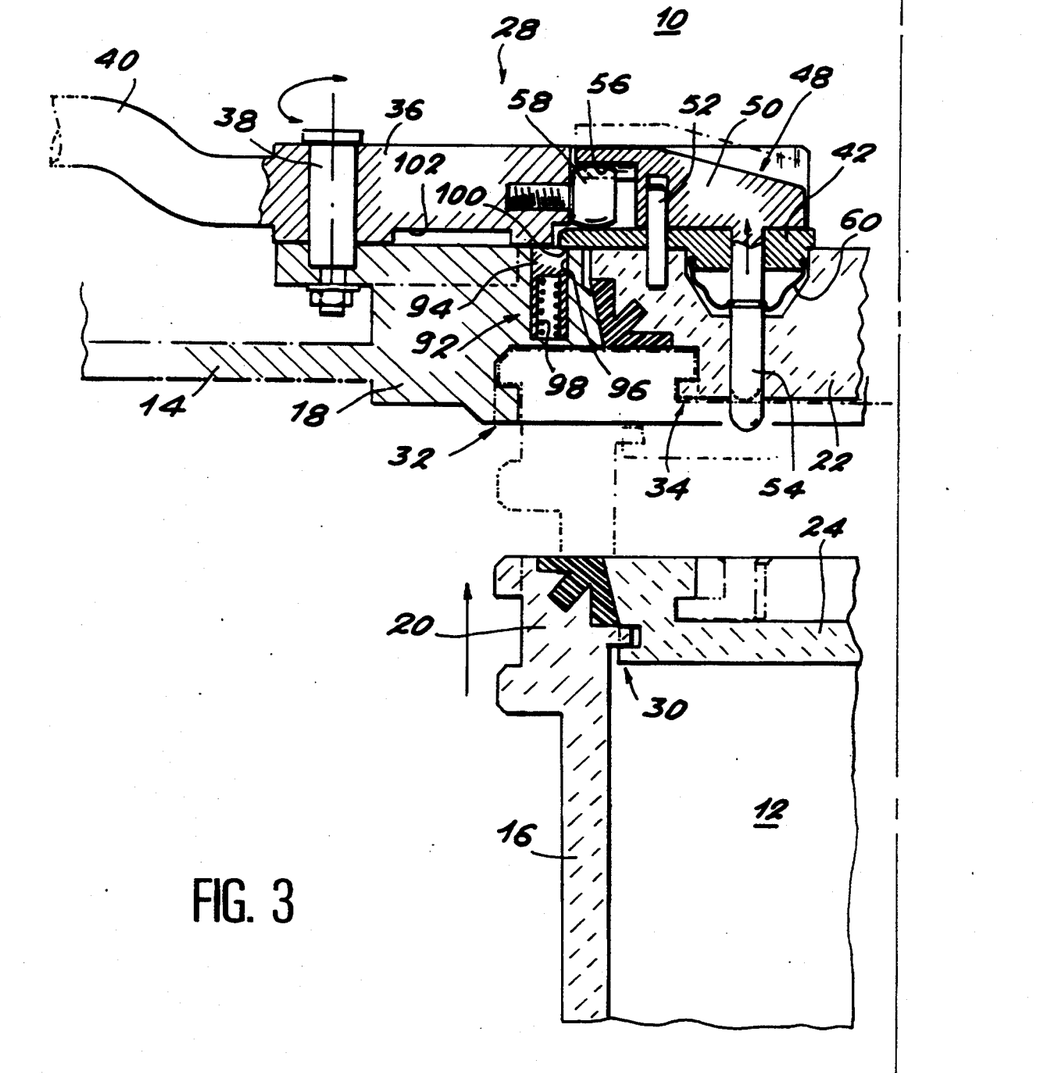
FIG. 3 A sectional view along line III—III of FIG. 2.

In the absence of the container door 24, i.e. when the mobile locking member 50 occupies its locking position illustrated in FIG. 3, the rod 54 normally projects on the face of the cell door 22 turned towards the exterior of the cell, under the effect of a not shown spring. Under these conditions, a locking portion 56 of the locking member 50 cooperates with a complementary portion of the control member 36 in order to immobilize the latter in its closed position. In the embodiment illustrated in the drawings, the locking portion 56 is constituted by an outer end of the locking member 50, which projects beyond the outer edge of the part 42, so as to be able to penetrate a notch 58 formed in the inner edge of the control member 36 and which constitutes the aforementioned complementary portion.

When a container 12 equipped with its container door 24 is engaged on the cell flange 18, the container door bears on the end of the control rod 54, which has the effect of forcing the locking member 50 back towards the interior of the cell in opposition to the not shown spring. The first bolt 48 is then in its unlocked state, because the locking portion 56 is freed from the notch 58, as shown in FIG. 11.

Figure 11:
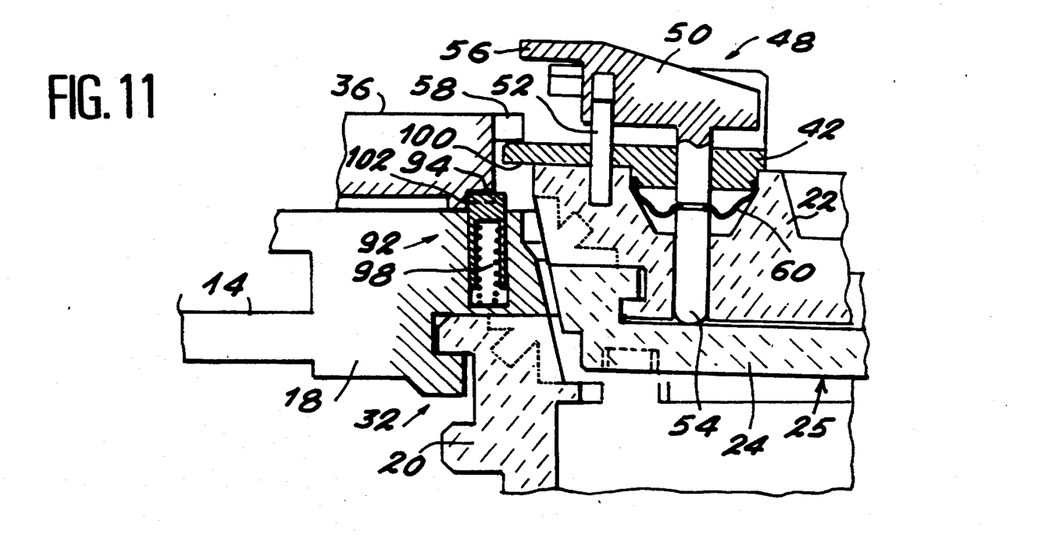
FIG. 11 A sectional view comparable to FIG. 3 illustrating the unlocking of the control member during the engagement of the container door and the locking of the control member preventing its return to the closed position, following the separation of the double door.

As is also illustrated by FIGS. 3 and 11, the sealing of the cell door 22 is advantageously maintained by placing between the latter and the control rod 54 traversing it a sealing member 60.

The safety means incorporated into the centralized control mechanism 28 also comprise a second bolt 62 (FIGS. 2, 4 and 9), whose function is to maintain the mobile control member 36 locked in its closed state, when the container flange 20 is not completely interlocked with the cell flange 18 by the bayonet joint 32.

Figure 4:
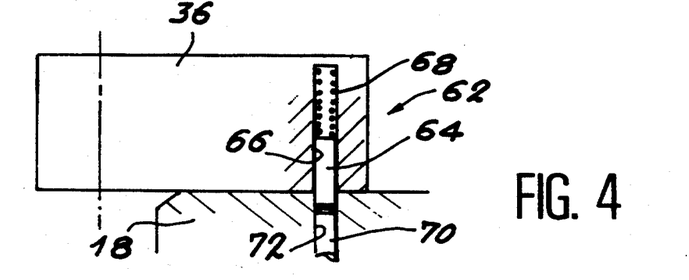
FIG. 4 A sectional view along line IV—IV of FIG. 2.
Figure 9:
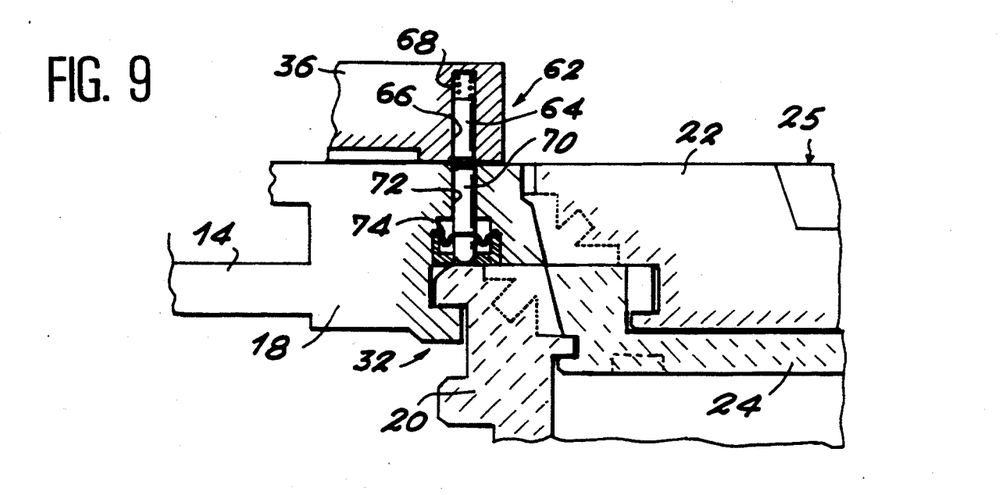
FIG. 9 A sectional view comparable to FIG. 4 illustrating the unlocking of the control member during the interlocking of the two flanges.

This second bolt 62 firstly comprises a locking rod 64, which is slidingly mounted in a blind bore 66 formed in the control member 36 parallel to its pivoting shaft 38. The open end of said blind bore 66 is turned towards the cell flange 18 and a helical compression spring 68 is placed between the locking rod 64 and the bottom of the bore 66. This spring 68 permanently maintains the locking rod 64 against the face of the cell flange 18 turned towards the interior of the cell 10.

The second bolt 62 also comprises a control rod 70 slidingly received in a through bore 72 in the cell flange 18, parallel to the axis of the opening defined by said flange. This through bore 72 has a diameter identical to that of the blind bore 66 and is aligned with the latter when the control member 36 occupies its aforementioned closed position.

Under these conditions and as illustrated by FIG. 4, the spring 68 simultaneously forces back the rods 64 and 70, so that the rod 64 is partly located in each of the two bores. This locking position is defined by a not shown, end of travel abutment of the rod 70. The position then occupied by the locking rod 64 has the effect of opposing any rotation of the control member 36 about its shaft 88. A sealing member 74 (FIG. 9) is interposed between the rod 70 and the cell flange 18 to maintain the seal of the latter.

In the locking position of the control member 36 by the second bolt 62, the end of the control rod 70 turned towards the outside of the cell 10 projects beyond a face of the cell flange 18 issuing into a slot of said flange able to receive a lug of the container flange 20, said slot and said lug belonging to the bayonet joint 32. More specifically, the rod 70 then projects into the aforementioned slot at a location such that the assembly formed by the two rods 70 and 64 is only forced back in opposition to the spring 68 when the bayonet joint 32 is completely locked.

When the interlocking of the two flanges 20 and 18 with the aid of the bayonet joint 32 is complete, the two rods 70, 64 are forced back in opposition to the spring 68, so that the joint plane between these two rods coincides with the joint plane between the cell flange 18 and the mobile control member 36, as illustrated by FIG. 9. It is then possible for the member 36 to rotate about its shaft 38.

The bolts 48 and 62 constitute complementary safety means making it possible to avoid an untimely opening of the cell door 22 respectively if a door-free container is engaged on the cell flange 18 and if the interlocking of the container flange 20 on the cell flange 18 with the aid of the bayonet joint 32 is not complete.

The safety means incorporated into the centralized control mechanism 28 also comprise a third bolt 78 (FIGS. 2, 5 and 10) for preventing the bayonet joint 32 between the flanges 18 and 20 from being disconnected when the control member 36 is manipulated in the sense of the opening of the double door.

In complementary manner to said third bolt 78, the mobile control member has a dead travel, between its normal closed position and an intermediate locking position of the bayonet joint 32, during which the rotation of the control member 36 about its shaft 38 has no effect on the double door (the corresponding portion of the parallel ramps 44 being perpendicular to the axis of the cell door 22). During this dead travel, the rotation of the control member 36 only has the effect of actuating the third bolt 78, in order to lock the bayonet joint 32.

Figure 10:
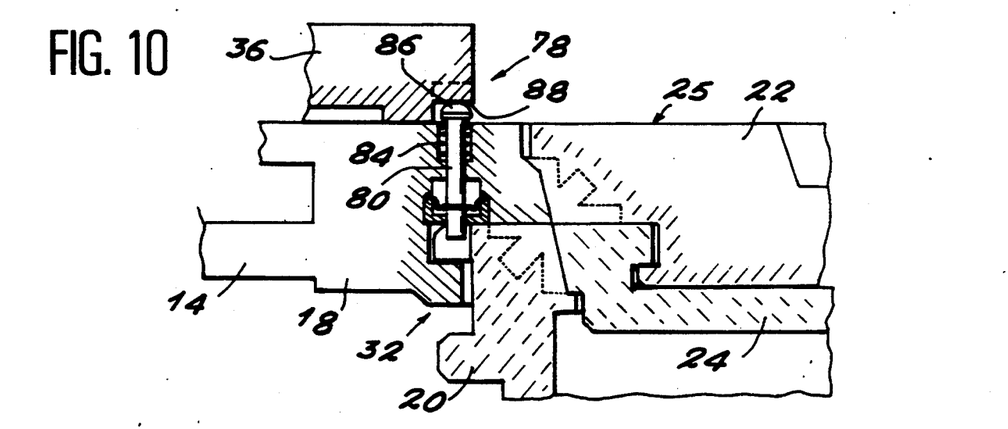
FIG. 10 A sectional view comparable to FIG. 5 illustrating the locking of the bayonet joint connecting the two flanges, when the control member reaches the intermediate locking position.

As illustrated by FIGS. 5 and 10, said third bolt 78 has a locking rod 80, which is slidingly mounted in a through bore 82 formed in the cell flange 18 parallel to the pivot pin 38. A compression spring 84 is interposed between a shoulder formed in the bore 82 and a head 86 of the locking rod 80 turned towards the interior of the cell 10, so as to permanently apply said head 86 to a cam surface 88 formed on the mobile control member 36. The tightness of the cell flange 18 is maintained by means of a sealing member 90 interposed between said flange and the locking rod 80.

The shape of the cam surface 88 is such that when the mobile control member 36 occupies its closed position (FIGS. 2 and 5), the end of the locking rod 80 opposite to the head 86 is flush with the face of the cell flange 18 turned towards the outside of the cell 10, in the slot intended to receive the lugs of the container flange 20 during the interlocking of said two flanges with the aid of the bayonet joint 32.

During a rotation of the mobile control member 36 from said closed position and up to the intermediate locking position of the bayonet joint 32, the cam surface 88 displaces the locking rod 80 towards the outside of the cell 10 in opposition to the action of the spring 84. Consequently and as illustrated in FIG. 10, the locking rod 80 projects into the slot of the cell flange 18 intended to receive the lugs of the container flange 20, when the mobile control member 36 is in its locking position. The location of the bore 82 in which is received the locking rod 80 is determined in such a way that said rod then opposes the rotation of the lugs formed on the container flange 20 in the disconnection direction of the bayonet joint 32.

The safety means incorporated into the centralized control mechanism 28 finally comprise a fourth bolt (FIGS. 2, 3 and 11) making it possible to prevent any possibility of the control member 36 returning from the locking position of the bayonet joint 32 towards the closed position of the double door 25 as soon as the separation or disengagement of the latter has commenced. Thus, if it was possible for the mobile control member 36 to return to the closed position at this stage, an operator might disconnect the container flange 20 from the cell flange 18 after the double door had been removed.

This fourth bolt 92 firstly comprises a locking finger 94 (FIGS. 3 and 11) slidingly mounted in a blind bore 96 formed in the cell flange 18 parallel to the axis of the opening defined by said flange and which issues into the interior of the cell 10. A compression spring 98 interposed between the locking finger 94 and the bottom of the blind bore 96 tends to move the locking finger 94 towards the interior of the cell 10.

The location of the blind bore 96 is such that it is normally partly closed by a projection of the part 42 when the cell door 22 is in place. Under these conditions, the locking finger 94 is completely retracted into the bore 96 by its bearing against a bearing surface 100 (FIG. 3) of the projection of the part 42.

Moreover a trapping slot 102, forming a circular arc centred on the pivoting shaft 38, is machined on the face of the mobile control member 36 turned towards the cell flange 18, so as to be positioned facing the bore 96 when the control member occupies its locking position, its extreme open position, or a position intermediate between said two positions. The edges of said trapping slot 102 are straight, so that the bearing of the end of the locking finger 94 against said edges opposes any rotation of the mobile control member 36 in the corresponding direction.

As soon as the double door 25 is separated or pulled away, as a result of the cooperation of the roller 46 with the parallel ramps 44, when the mobile control member 36 rotates about its shaft 38 in the counterclockwise direction from its locking position to its open position, the bearing surface 100 moves away from the cell flange 18, so that the locking finger 94 is forced back into the trapping slot 102 by the spring 98 (FIG. 11). The continuation of the rotation of the mobile control member 36 in the clockwise direction has the effect of continuing the pulling away of the double door and of making the locking finger 94 traverse the trapping slot 102. The open position is defined by the abutment of the locking finger 94 on the corresponding end of the trapping slot 102. In this position, the complementary shapes given to the part 42 and to the mobile control member 36 make it possible to pivot the double door about the hinge 26.

If an operator then manipulates the mobile control member 36 in the clockwise direction, the locking finger 94 abuts against the opposite end of the trapping slot 102 as soon as the mobile control member reaches the locking position of the bayonet joint 32. Consequently it is not possible to bring the mobile locking member 36 into the closed position authorizing the disconnection of the flanges 18 and 20.

In order to ensure the closure of the double door before disconnecting the container 12 from the cell 10, the operations are performed in the reverse order to those described hereinbefore.

Obviously, the different safety means incorporated into the centralized control mechanism according to the invention can assume forms different from those described without passing outside the scope of the invention. In addition, the control member can be mobile in translation and not in rotation.

I claim:

1. A centralized control mechanism for a device for the tight transfer between two closed volumes, said device comprising a first flange and a second flange defining respectively a first opening and a second opening, a first bayonet joint adapted to interlock said first flange with said second flange, a first door and a second door respectively adapted to close said first opening and said second opening, a hinge means by which said first door is articulated to the first flange, and a second bayonet joint adapted to interlock said first door with said second door, said centralized control mechanism being provided at a substantially diametrically opposite location with respect to said hinge means, said centralized control mechanism comprising:

a mobile control member articulated on the first flange, by a shaft which is parallel to an axis of said first opening, for controlling opening and closing of the first door, said control member being pivotable between a closed position and an open position, while passing through an intermediate locking position;

ramp means provided between the control member and the first door, said ramp means allowing pivoting of the first door about said hinge means when the control member is in said open position and controlling a separating movement of the first door with respect to the first flange when the control member is moved from said closed position towards said open position; and safety bolt means interacting with the control member, for preventing leakage of said closed volumes in any position of said control member.

2. A control mechanism according to claim 1, wherein the safety bolt means comprises:

first bolt means provided between the first door and the control member, said first bolt means normally locking the control member in said closed position and being responsive to a contact of the second door against the first door for unlocking said control member;

second bolt means provided between the first flange and the control member, said second bolt means normally locking the control member in said closed position and being responsive to an interlocking of the first bayonet joint for unlocking said control member;

third bolt means provided between the first flange and the second flange, said third bolt means allowing relative rotation between said flanges when the control member is in said closed position, and being responsive to a location of the control member in a position located in a range extending from said locking position to said open position for locking the first bayonet joint in said interlocking state of the first flange on the second flange; and fourth bolt means provided between the first flange and the control member, said fourth bolt means allowing free rotation of the control member when the first opening is closed by said first door, and being responsive to opening of said first door for locking the control member in a range extending from said locking position to said open position.

3. A control mechanism according to claim 1, wherein the first bolt means comprises a first mobile locking member supported by the first door on a side opposite to the second door, said locking member having a first control rod which traverses the first door and a locking part able to cooperate with a complementary part of the control member, when said control member occupies said closed position and when the second door does not force back the control rod in order to ensure the locking of the control member.

4. A control mechanism according to claim 2, wherein the second bolt means comprises a first locking rod slidingly mounted in a bore of the control member, a first elastic means tending to displace said first locking rod towards the first flange, so as to partly introduce said first locking rod into a through bore formed in said first flange when the control member occupies said closed position, and a second control rod slidingly mounted in said through bore, so as to project on one face from the first flange turned towards the second flange, at a location such that said second control rod is only forced back, to allow rotation of the control member, when the first bayonet joint is locked.

5. A control mechanism according to claim 2, wherein the third bolt means comprises a second locking rod slidingly mounted in a second bore of the first flange, second elastic means applying one end of said second locking rod against a cam surface formed on the control member, in such a way that an opposite end of the second locking rod is retracted into the second bore when the control member is in the closed position, and projects on one face of the first flange turned towards the second flange, at a location such that said second locking rod locks the first bayonet joint in a locked position when the control member is located in the range extending from the intermediate locking position to the open position.

6. A control mechanism according to claim 2, wherein the fourth bolt means comprises a locking finger slidingly mounted in a third bore of the first flange, third elastic means tending to apply the locking finger to a facing face of the control member, a trapping slot formed in said facing face, so as to face the locking finger when the control member is located in the range extending from the intermediate locking position to the open position, and a bearing surface linked with the first door, maintaining the locking finger entirely in the third bore when the first door is not separated from the first flange.

7. A control mechanism according to claim 6, wherein said ramp means comprises two facing, parallel ramps connected to the first door, and a roller carried by the control member and simultaneously cooperating with said two parallel ramps.

8. A control mechanism according to claim 7, wherein said bearing surface and said parallel ramps are formed on a part which is fixed to one face of the first door opposite to the second door, said part also supporting the first bolt means.

9. A control mechanism according to claim 1, wherein the control member is mounted on a face of the first flange opposite to the second flange.

10. A control mechanism according to claim 1, wherein the control member is provided with a manual control lever.

* * * * *

UNITED STATES PATENT AND TRADEMARK OFFICE
CERTIFICATE OF CORRECTION

PATENT NO. : 5,421,626
DATED : June 6, 1995
INVENTOR(S) : Charles Glachet

It is certified that error appears in the above-indentified patent and that said Letters Patent is hereby corrected as shown below:

On the title page item [73], should read --Sne La Calhene--.

On the face of the patent, the following information should be inserted with respect to Attorney, Agent or Firm: --Pearne, Gordon, McCoy & Granger--.

Column 4, line 21, delete "18" and insert --16--; and line 31, delete "18" and insert --16--.

Column 6, line 35, delete "88" and insert --38--.

Signed and Sealed this

Twenty-sixth Day of December, 1995

Attest:

BRUCE LEHMAN

*Attesting Officer*      *Commissioner of Patents and Trademarks*